(12) United States Patent
Vilhauer et al.

(10) Patent No.: US 10,256,665 B2
(45) Date of Patent: Apr. 9, 2019

(54) POWER TRANSMITTING DEVICE HAVING WIRE-FREE POWER TRANSFER SAFETY DETECTION

(71) Applicant: INTEL CORPORATION, Santa Clara, CA (US)

(72) Inventors: Reed D. Vilhauer, Portland, OR (US); John J. Fallin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 250 days.

(21) Appl. No.: 15/201,039

(22) Filed: Jul. 1, 2016

(65) Prior Publication Data

US 2018/0006484 A1    Jan. 4, 2018

(51) Int. Cl.
*H02J 50/10*    (2016.01)
*H02J 7/02*    (2016.01)
*H02J 50/80*    (2016.01)
*H02J 7/04*    (2006.01)

(52) U.S. Cl.
CPC ............. *H02J 50/10* (2016.02); *H02J 7/025* (2013.01); *H02J 7/041* (2013.01); *H02J 7/042* (2013.01); *H02J 50/80* (2016.02)

(58) Field of Classification Search
CPC .. H02J 7/025; H02J 50/80; H02J 50/10; H02J 7/041; H02J 7/042

USPC ......................................................... 307/104
See application file for complete search history.

(56) References Cited

U.S. PATENT DOCUMENTS

| | | |
|---|---|---|
| 2010/0070659 A1* | 3/2010 | Ma ...................... G06F 13/385 710/14 |
| 2012/0249084 A1 | 10/2012 | Vilhauer et al. |
| 2013/0283083 A1 | 10/2013 | Vilhauer et al. |
| 2014/0189387 A1 | 7/2014 | Vilhauer et al. |

* cited by examiner

*Primary Examiner* — Carlos D Amaya
(74) *Attorney, Agent, or Firm* — Schwabe, Williamson & Wyatt, P.C.

(57) ABSTRACT

An electronic device may include a power driver to receive power and to selectively provide power, and a plurality of power transfer contacts to receive power from the power driver and to provide power to an external device. A controller may control the power driver to provide power to the plurality of power transfer contacts based on a plurality of time periods having a frequency shifted such that a length of a second one of the time periods is different than a length of a first one of the time periods. The controller may control the power driver to disconnect power from the power driver to the power transfer contacts during a plurality of test time durations. The controller may obtain data during the plurality of test time durations.

25 Claims, 6 Drawing Sheets

POWER TRANSMITTING DEVICE HAVING WIRE-FREE POWER TRANSFER SAFETY DETECTION

BACKGROUND

1. Field

Embodiments may relate to wire-free power transfer safety detection.

2. Background

A power transmitting device may provide a power transfer or charging mechanism for powering one or more compatible devices via a wire-free power transfer (or wireless power transfer). The power transmitting device may be a charging pad, for example. More than one compatible device may be charged or powered at the same time. The power transmitting device may be connected to a power source, and may provide power to a device (or apparatus) when the device (or apparatus) is provided on the power transmitting device. The device may be an electronic device or a battery powered tool, for example. The power transmitting device may perform a safety and invalid object detection to determine if any invalid object is on the power transmitting device.

BRIEF DESCRIPTION OF THE DRAWINGS

Arrangements and embodiments may be described in detail with reference to the following drawings in which like reference numerals refer to like elements and wherein.

DETAILED DESCRIPTION

In the following description, numerous specific details may be set forth. However, it is understood that embodiments may be practiced without these specific details. In other instances, well-known circuits, structures and techniques have not been shown in detail in order not to obscure an understanding of this description.

References to "one embodiment," "an embodiment," "example embodiment," "various embodiments," etc., indicate that embodiments may include particular features, structures, or characteristics, but not every embodiment necessarily includes the particular features, structures, or characteristics. Further, some embodiments may have some, all, or none of the features described for other embodiments. Features from one embodiment (or arrangement) may be combined with features of other embodiments (or arrangements).

As used hereinafter, the words "wire-free", "wireless power transfer" or "wire-free power transfer" may be used to relate to transfer of power from a first device to a second device when the second device is not physically connected by a wire (or wires) to the first device. As one example, the second device may include conductive contacts that physically contact conductive contacts (or power transfer contacts) on the first device. Power may be transferred from the first device to the second device without any wire between the conductive contacts of the first device and the conductive contacts (or power transfer contacts) of the second device.

Wire-free power transfer may involve a power transmitting device (or charging device) to transfer power to an electronic device or other type of device, for example. For ease of discussion, the following description may relate to providing power to an electronic device (or device). The electronic device (or receiving device) may power any one of a wide variety of battery powered devices including mobile terminals, such as personal digital assistants (PDAs), pagers, mobile televisions, mobile telephones, smartphones, gaming devices, laptop computers, tablet computers, cameras, camera phones, video recorders, audio/video players, radios, global positioning system (GPS) devices, navigation devices, and/or any combination of the aforementioned. The device may be a device that has no battery but that only draws power when placed on (or provided on) a wire-free charging pad, for example.

The power transmitting device (or charging device) may include a charging pad (or charging mat). The receiving device (or apparatus) may be physically provided on the charging pad (or charging mat) in order to receive a wire-free power transfer from the charging pad. For example, the charging pad (or mat) may provide (or deliver) 20 Watts (W) or more of power to the device physically provided on the charging pad.

Figure 1:
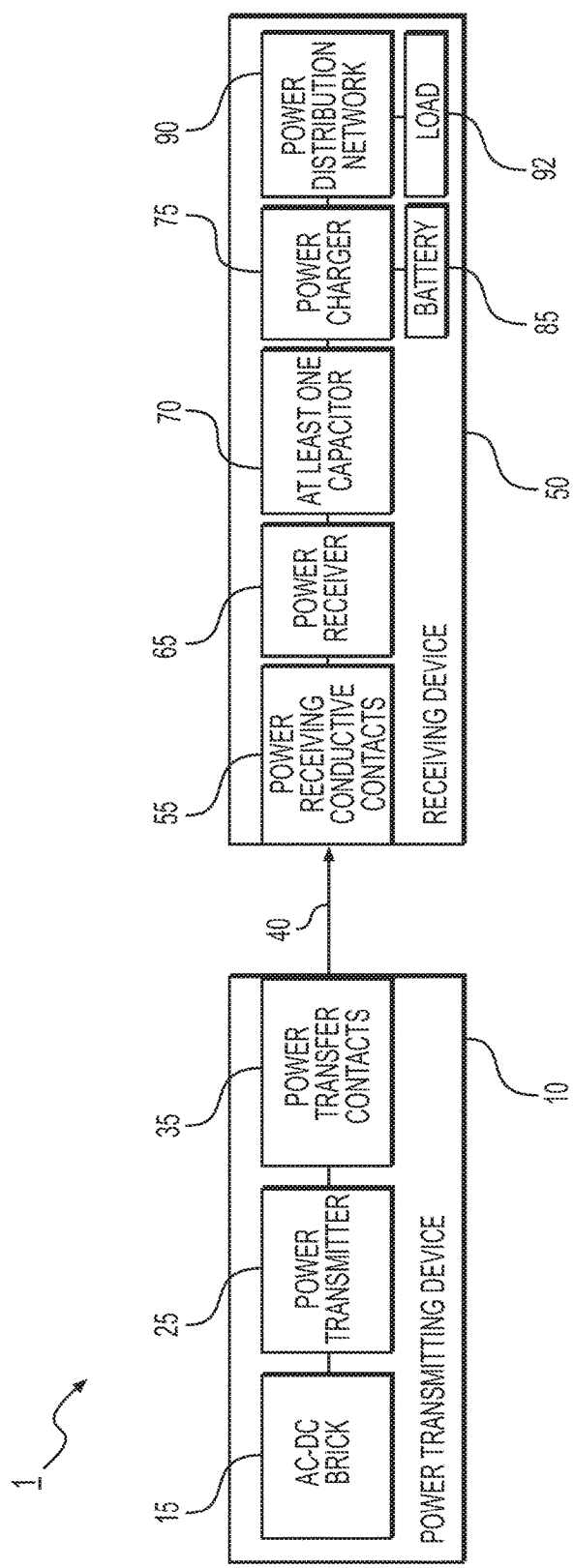
FIG. 1 is a block diagram of a wire-free power transfer system according to an example arrangement.

FIG. 1 is a block diagram of a wire-free power transfer system according to an example arrangement. Other arrangements and configurations may also be provided. The wire-free power transfer system may also be called a wire-free charging system.

FIG. 1 shows a wire-free power transfer system 1 that includes two separate devices, namely a power transmitting device 10 and a receiving device 50. The wire-free power transfer system 1 is considered wire-free because the power transmitting device 10 is not connected by wires to the receiving device 50. Rather, as will be described below, the receiving device 50 may electrically couple to the power transmitting device 10 via conductive contacts that a user of the device does not have to manually connect or even think about during a power transfer session. FIG. 1 shows wire-free transfer power medium 40 being provided from the power transmitting device 10 to the receiving device 50.

The wire-free power transfer system 1 may be considered wire-free because there are no wires (or long wires) between the power transmitting device 10 and the receiving device 50. The power transfer system includes a point to point electro-mechanical connection that transfers electricity without users needing to physically contact wires or worry about orientation.

As shown in FIG. 1, the power transmitting device 10 may include an alternating current-direct current (AC-DC) brick 15, a power transmitter 25 (or power transmitter device) and power transfer contacts 35. Other components may also be provided.

The AC-DC brick 15 may be a power source that receives AC power and provides DC power. As one example, the AC-DC brick may receive AC voltage (110V/60 Hz or 220V/50 Hz) and convert the received AC power into a DC voltage of either 15V or 20 V, for example. Other power sources may also be provided.

The power transmitter 25 may receive the DC power from the AC-DC brick 15, and the power transmitter 25 may provide DC power (or DC-like power) to the power transfer contacts 35. The power transmitter 25 may include a controller (or microcontroller) to control the power provided to the power transfer contacts 35. The power transmitter 25 may include other components, such as a voltage regulator, a driver circuit (or circuits), power transistors, etc. As one example, the controller may control a driver circuit and/or power transistors in order to control the power provided from the AC-DC brick 15 to the power transfer contacts 35.

The power transfer contacts 35 may include a plurality of conductive contacts as will be described below. The power transfer contacts 35 may include a plurality of conductive strips and/or a plurality of conductive pads. The power transfer contacts 35 may be provided on (or at) a charging pad or charging mat.

As shown in FIG. 1, the receiving device 50 may include power receiving conductive contacts 55 (or conductive contacts), a power receiver 65 (or power receiver device), at least one capacitor 70 (or capacitors), a power charger 75, a battery 85, a power distribution network 90 and a load 92. Other components may also be provided.

In at least one arrangement, the capacitor (or capacitor devices) may supply temporary power to the power charger 75 and/or the power distribution network 90 when power is not received from the power transmitting device 10 (via the wire-free power transfer).

The power receiving conductive contacts 55 may include a plurality of contacts at a bottom surface of the receiving device 50, for example. The plurality of contacts may be geometrically positioned on the receiving device 50 to contact two (at a minimum) of the power transmitting contacts 35 of the power transmitting device 10 when the receiving device 50 is physically on the power transmitting device 10. The two contacts may include one contact of each polarity.

Based on a position of the receiving device 50 relative to the power transmitting device 10, the power receiving conductive contacts 55 may physically contact the power transfer contacts 35 (of the power transmitting device 10). When the power receiving conductive contacts 55 (of the receiving device 50) physically contact the power transfer contacts 35 (of the power transmitting device 10), then the controller of the power transmitter 25 may provide a wire-free power transfer (at the wire-free power transfer medium 40) from the power transfer contacts 35 (of the power transmitting device 10) to the power receiving conductive contacts 55 (of the receiving device 50).

The power receiver 65 may receive power from the power receiving conductive contacts 55 and provide power to the at least one capacitor 70, the power charger 75 and/or the power distribution network 90. The power receiver 65 may include a bridge rectifier and a voltage regulator, for example, to properly regulate the power. The power charger 75 may store the received power in the battery 85, for example. The receiving device 50 may include at least one capacitor 70 (or a voltage holding capacitor) between the power receiver 65 and the power charger 75 to maintain a usable voltage to the power charger 75 when power to the power receiver 65 is cut (or disconnected from the power transmitting device 10) during a test time duration (or test time period). As used hereinafter, the test time duration shall be designated Ttest.

Figure 2A:
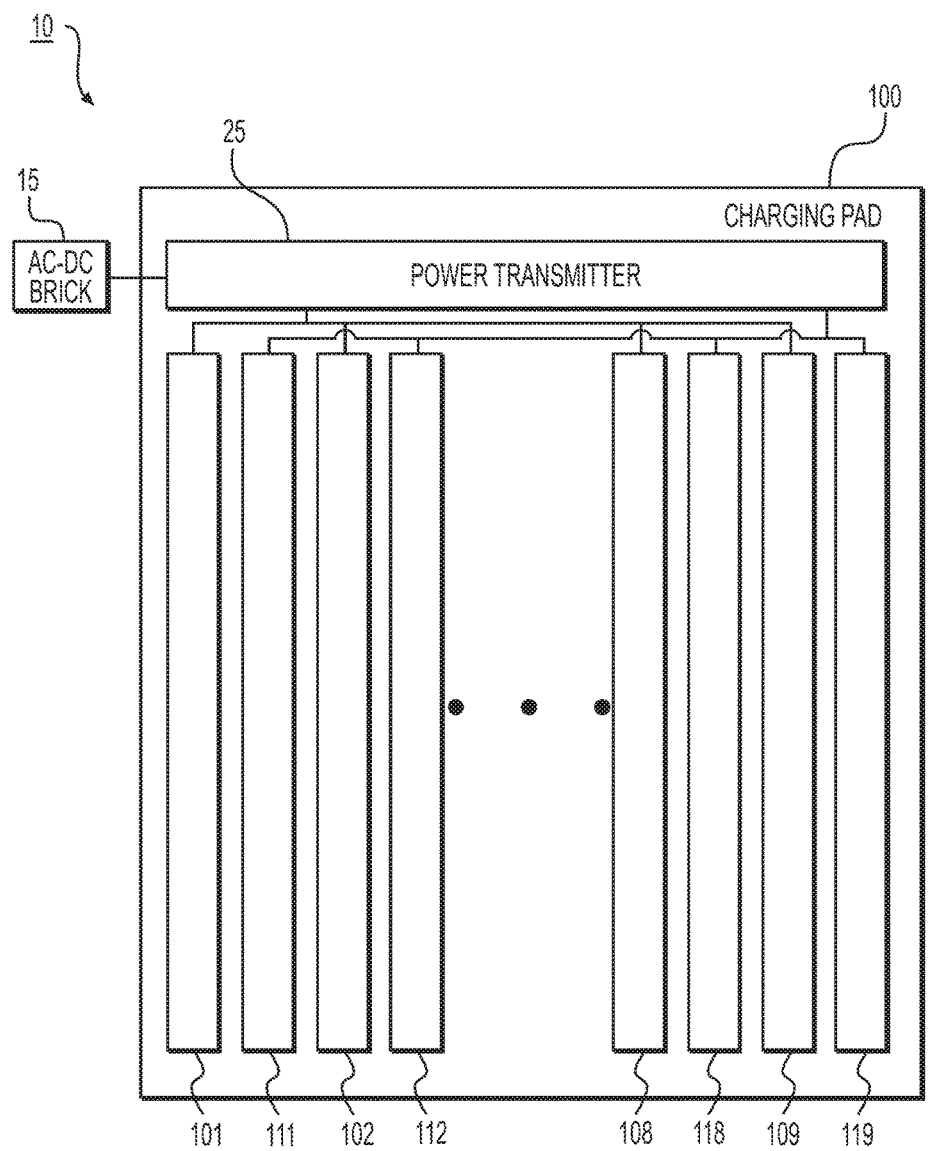
FIG. 2A shows a power transmitting device according to an example arrangement.

FIG. 2A shows a power transmitting device according to an example arrangement. Other arrangements and configurations may also be provided.

More specifically, FIG. 2A shows a plurality of conductive contacts corresponding to the power transfer contacts 35 (shown in FIG. 1). FIG. 2A also shows the power transmitter 25. The power transfer contacts and the power transmitter 25 may be provided on (or at) a charging pad 100 (or charging mat). In at least one arrangement, the charging pad 100 may be electrically coupled to the AC-DC brick 15.

The power transmitter 25 may provide a positive DC voltage to specific ones of the power transfer contacts 35, and the power transmitter 25 may provide a reference GROUND to other specific ones of the power transfer contacts. The power transfer contacts that receive a positive voltage may hereafter be referred to as positive contacts, and the power transfer contacts that receive the reference ground may hereafter be referred to as ground contacts. In at least one arrangement, the ground contact may be coupled to a ground system of the power transmitter 25. Current sensing circuitry may be provided between the transmitter ground and the ground contact.

The power transfer contacts 35 at the charging pad 100 may include a plurality of parallel power transfer contacts, as shown in FIG. 2A. Each of the plurality of parallel conductive contacts may be considered either a positive contact or a ground contact. The positive contacts and the ground contacts may be alternatively arranged at the charging pad 100. For example, power transfer contacts 101, 102, . . . , 108 and 109 may be considered the positive contacts (or first set of power transfer contacts) that receive a positive voltage from the power transmitter 25, and power transfer contacts 111, 112, . . . , 118 and 119 may be considered the ground contacts (or second set of power transfer contacts) that receive the reference ground from the power transmitter 25. The positive and ground contacts at the power transmitting device 10 (or charging pad 100) may be alternatively arranged in accordance with the objective of the power transfer system.

In at least one arrangement, the receiving device 50 may include a plurality of power receiving conductive contacts 55 on a bottom surface of the receiving device 50. The plurality of power receiving conductive contacts 55 may be specifically arranged on the bottom surface such that at least two of the conductive contacts (of the receiving device 50) physically contact at least two of the power transfer contacts of the power transmitting device 10. At least two of the conductive contacts 55 of the receiving device 50 are geometrically arranged on the receiving device 50 to physically contact at least one of the positive contacts (at the charging pad 100) and at least one of the ground contacts (at the charging pad 100) regardless of orientation of the receiving device 50 provided on the charging pad 100 (i.e., any one of 0 to 360 degrees) such that a circuit is created and electricity flows.

The arrangement of the plurality of power transfer contacts 35 on the charging pad 100 allows a plurality of electronic devices to charge at a same time on the charging pad 100. The charging pad (or device) may therefore be large in size. The electronic devices may be considered valid objects if the device is a proper electronic device designed to receive wire-free power from a mating power transfer device (i.e., the power transmitting device). Unfortunately, other objects may also be provided on the charging pad 100. For example, other objects (such as keys, paper clips, fingers, water, coins, other electronic devices without the technology, etc.) may contact the power transfer contacts 35 of the charging pad while other devices are actively receiving power (i.e., wire-free power transfer). These other objects may be considered invalid objects, and the invalid objects should not compromise safety or proper power transfer to valid objects. As will be discussed below, one objective is to determine if any invalid objects are present at (or on) the charging pad.

Figure 2B:
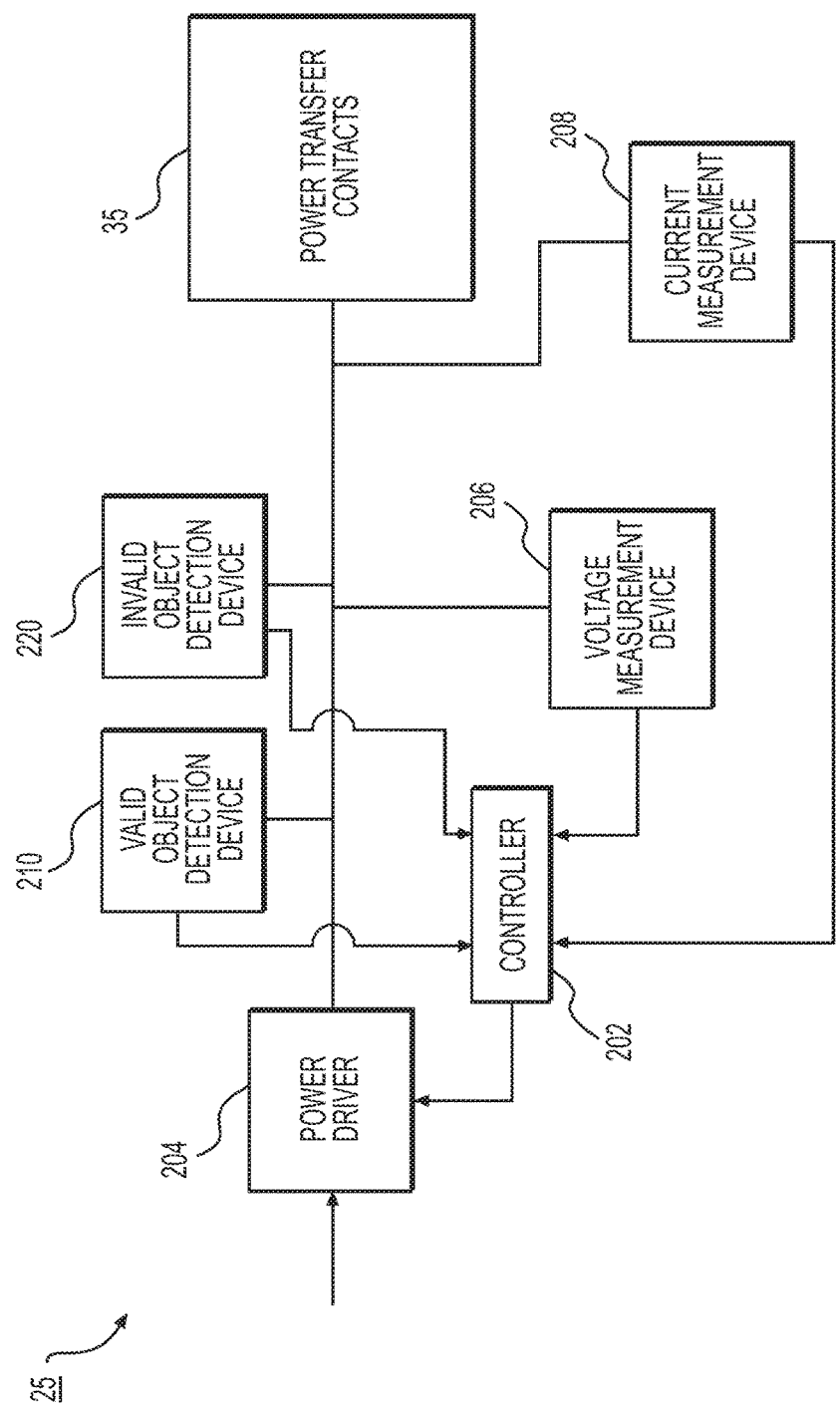
FIG. 2B shows components of a power transmitter and power transfer contacts according to an example embodiment.

FIG. 2B shows components of a power transmitter and power transfer contacts according to an example embodiment. Other embodiments and configurations may also be provided.

More specifically, FIG. 2B shows components of the power transmitter 25 (of the power transmitting device 10) and the power transfer contacts 35. As shown in FIG. 2B, the power transmitter 25 includes a controller 202, a power driver 204 (or component), a voltage measurement device 206 and a current measurement device 208. Other components or elements may also be part of the power transmitter.

The power driver 204 may receive DC power, such as from the AD-DC brick 15. The power driver 204 may include a plurality of transistors and/or at least one driver. The power driver 204 may be selectively controlled (by the controller) to provide power to the power transfer contacts 35. The power driver 204 may enable and disable power to the power transfer contacts 35. The power driver 204 may be a circuit and/or a device. More specifically, the power driver 204 may operate such that power from the AC-DC brick is cut off from reaching the power transfer contacts 35.

The controller 202 may control the turning on of elements (or components) of the power driver 204, which allows power to be provided for the AC-DC brick to the power transfer contacts 35. The controller 202 may also turn off elements (or components) of the power driver 204, which cuts off power from the AC-DC brick from being received at the power transfer contacts 35.

FIG. 2B also shows a valid object detection device 210 (or valid object detection circuit) to obtain and/or provide information regarding whether a valid object is provided on the power transfer contacts 35. The obtained information may be provided to the controller 202, for example.

FIG. 2B also shows an invalid object detection device 220 (or invalid object detection circuit) to obtain and/or provide information regarding whether an invalid object is provided on the power transfer contacts 35 during test time durations. The test time duration Ttest is a time period in which full positive power is not provided from the power driver 204 (i.e., originally from the AC-DC brick) to the power transfer contacts 35, but rather voltage sufficient to properly complete invalid device detection may be provided. The obtained information may be provided to the controller 202.

In at least one arrangement, the invalid object detection device 220 may perform a methodology or algorithm (such as an invalid object detection operation) in order for the invalid object detection device 220 and/or the controller 202 to determine whether an invalid object is provided on the power transfer contacts 35.

The invalid object detection operation may also be called a safety and invalid object detection operation. The invalid object detection operation may obtain information regarding an invalid object provided on the power transfer contacts 35 (of the charging pad 100). The controller 202 may determine whether an invalid object is present based on information received from the invalid object detection device 220 (or the determination may be made by the invalid object detection device 220).

If an invalid object is detected, then power may be denied from being provided to the power transfer contacts 35 (from the AC-DC brick). Subsequently, power may be provided to the power transfer contact (i.e., the power turned on) and valid device detections and safety checks may be retried after some period of time.

The invalid object detection operation may utilize a power cycling method in which power to the receiving device 50 may be cut off for short periods of time (during the test time duration Ttest). During this test time, the power transmitter may execute an invalid object detection algorithm, such as based on operations of the invalid object detection device 220. As one example, power to the receiving device may be cut off (or denied) for several microseconds, such as 10 microseconds, for example. Other time durations (such as 8 microseconds may also be used) and are a function of circuitry involved in the power receiver(s). The invalid object detection operation may also be considered a conductive wire-free safety check. Information of the object detection operation may be provided to the controller 202.

The conductive wire-free pad safety check may occur many hundreds of times a second in order to ensure good, reliable operation with a quality user experience and perception of safety. The controller may attempt to determine which item (during short, periodic safety/invalid device checks) include objects such as fingers, palms, water, keys, and/or other detritus. For objects that are not highly conductive (e.g. electrical shorts), the presence of objects may be detected by detecting capacitance and/or resistance at specific levels not seen on the charging pad without rogue objects. For determining low resistance (such as a short circuit), simple overcurrent or under voltage type methods may be used. More specifically, capacitance and resistance levels may be detected by the controller 202 while examining waveforms on the positive contacts (of the power transmitting device 10) during the test time duration Ttest.

The invalid object detection operation may be done during short periods of time (i.e., test time durations) when the pad disconnects charging power from the power transfer contacts 35. During these test time durations, the receiving device may supply its own power via the voltage holding capacitors so as to have no loss of service from the power transfer network and user perception of power loss. The controller 202 may observe and analyze waveforms of the voltage on the power transfer contacts during each test time duration.

Based on information collected during the test time durations, a determination may be made by the controller 202 (or made by the invalid object detection device) regarding the presence of an invalid object. The power transmitting device may provide an indication (audio or visual) of the invalid object provided on the charging pad.

Figure 4:
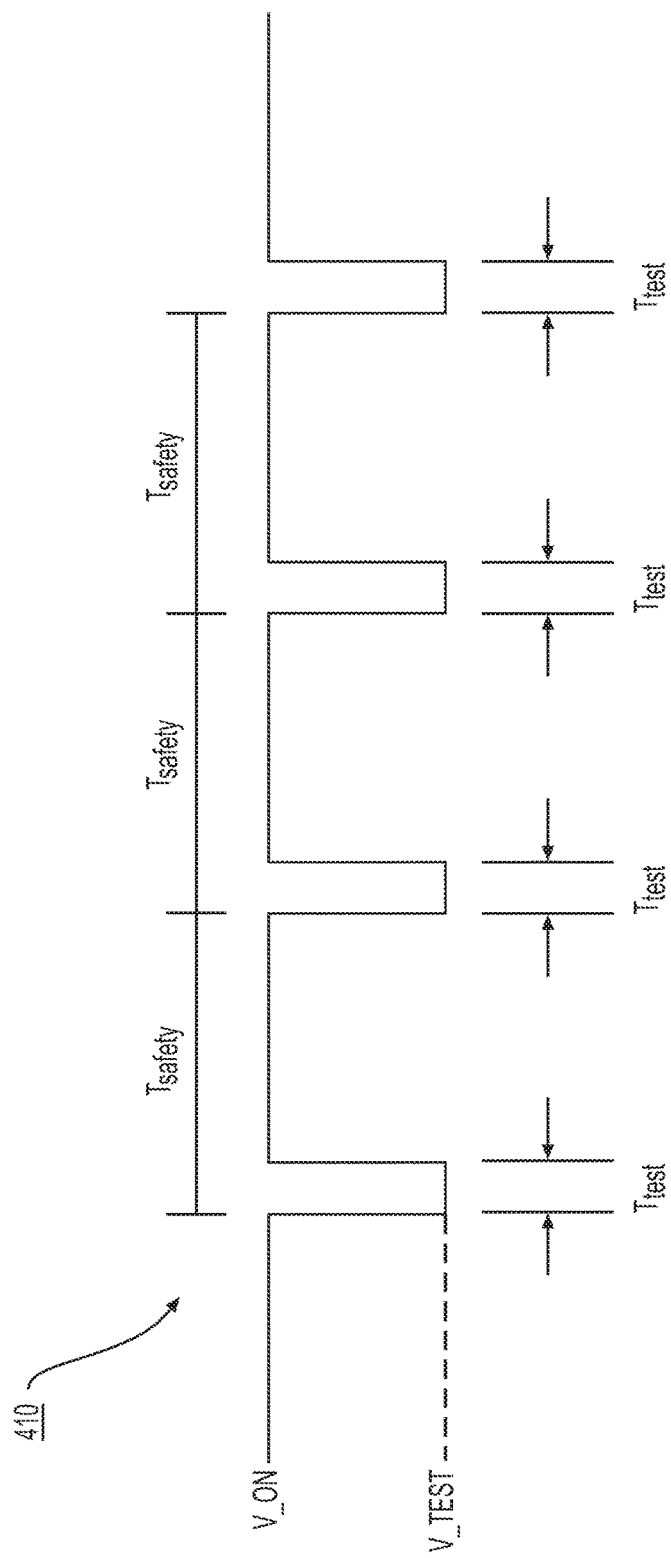
FIG. 4 shows a waveform of power supply to conductive contacts according to an example arrangement.
Figure 5:
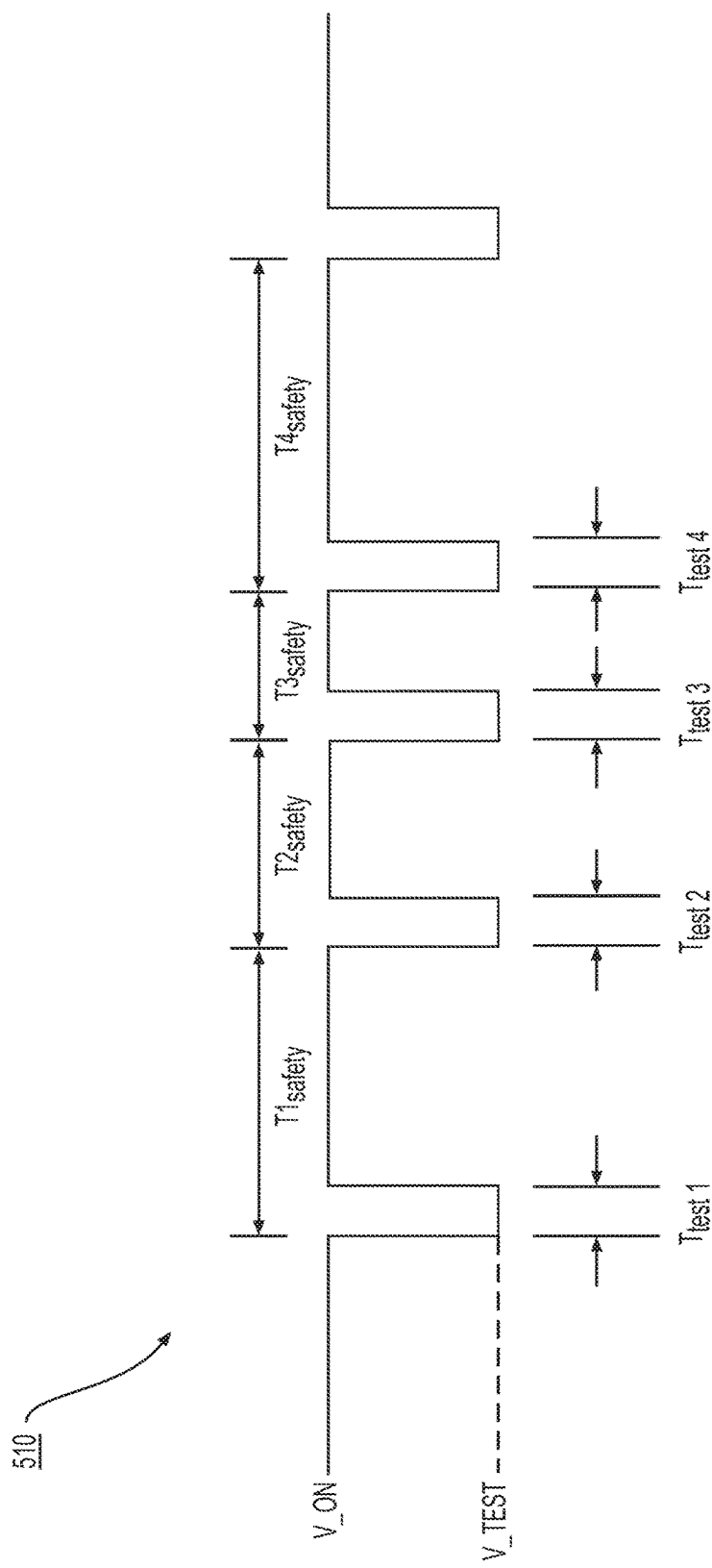
FIG. 5 shows a waveform of power supply having frequency shifting for wire-free power transfer safety detection according to an example embodiment.

The power transmitter 25 may include a clock device (and/or a controller) that provides time periods (such as Tsafety) and test time durations (such as Ttest). The determined time periods and test time durations may be provided to various components such that the components operate accordingly. For example, FIGS. 4-5 show waveforms of voltage (or power supply) based on the time period, and shows time durations in which a full voltage is not being provided to the receiving device (since the power transfer contact does not receive the power from the AC-DC brick). The clock device may be part of the power transmitter, for example. A clock device (or base clock device) may be provided, along with a divider or multiplier, in order to provide different variations of the clock device. In at least one embodiment, the controller may include the clock, and an algorithm or software may adjust parameters of the clock.

Figure 3:
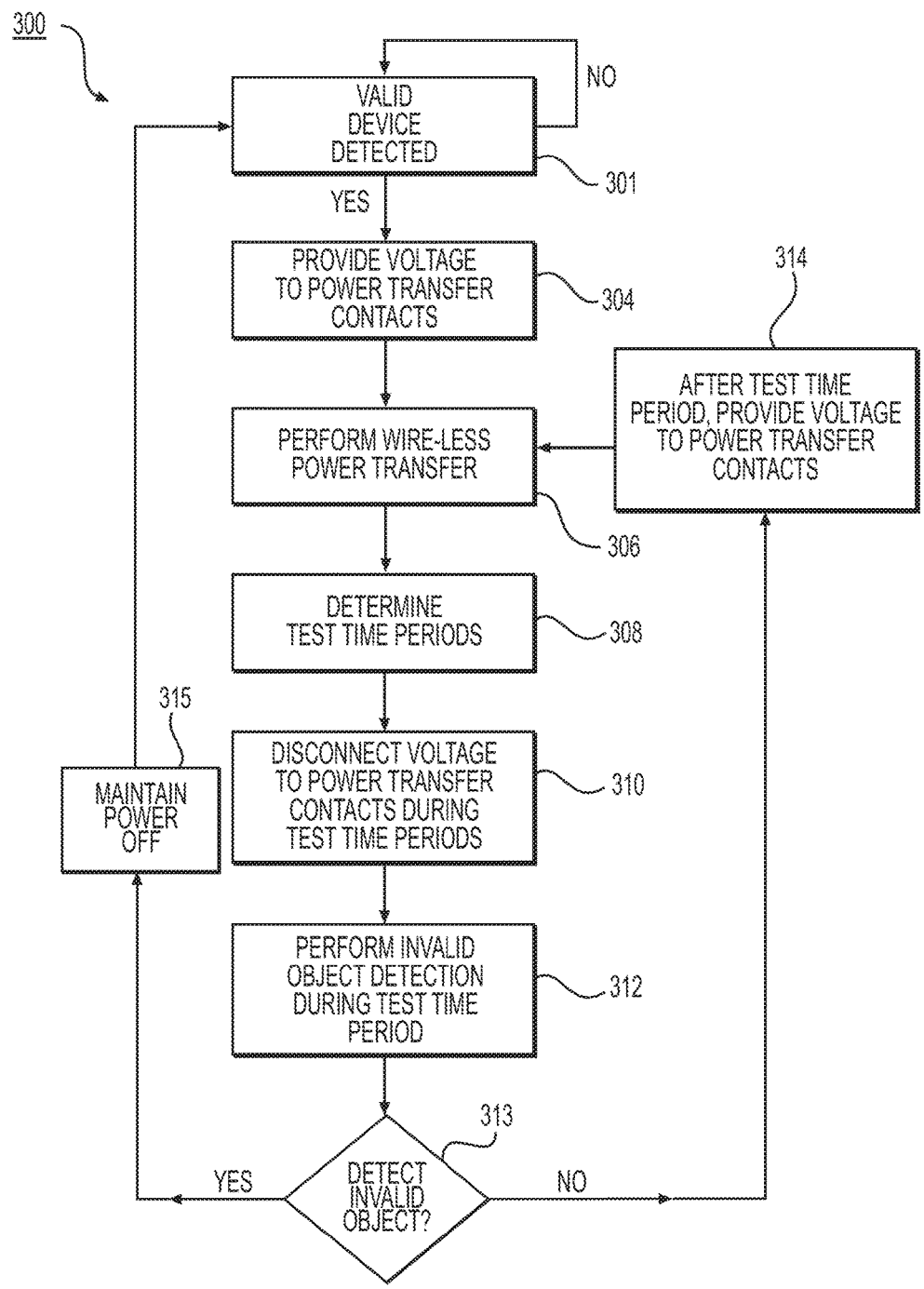
FIG. 3 is a flow chart showing operations of wire-free power transfer and invalid object detection.

FIG. 3 is a flow chart showing operations of wire-free power transfer and invalid object detection. Other operations and orders of operations may also be provided. The operations in FIG. 3 show features relating to wire-free power transfer between a power transmitting device and a receiving device, and features relating to test time durations in which invalid object detection may be performed. The invalid object detection may involve obtaining data during the test time duration (i.e., the time duration in which wire-free power transfer does not occur).

FIG. 3 is a flow chart 300 showing operations. Before applying full power (i.e., 15 volts or 20 volts) to the power transfer contacts, a valid device detection may be performed by using a lower voltage (<3 volts). For example, in operation 301, a determination is made regarding a valid device on the charging pad 100. If a valid device is detected on the power transfer contacts, then operations proceed to operation 302. On the other hand, if a valid device is not detected on the power transfer contacts, then operation 301 may continue.

In operation 304, voltage (or power) may be provided (via the power drive) to the power transfer contacts (of the power transmitting device 10). The voltage (or power) may be provided based on the controller turning on elements (or components) of the power driver.

In operation 306, wire-less power transfer may occur between the power transmitting device and the receiving device based on the voltage provided to the power transfer contacts. The wire-less power transfer may be between the power transfer contacts of the power transmitting device and the power receiving conductive contacts of the receiving device.

In operation 308, the time period and test time durations (Tsafety and Ttest) may be determined and/or identified. In operation 310, the voltage (or power) to the power transfer contacts may be disconnected during the test time durations. Operations 308 and 310 may occur substantially simultaneously. As will be discussed below, the test time durations occur at a start of each time period. In at least one embodiment, the time period between each test time duration may vary and/or be different. Additionally, the actual test time duration Ttest may be different and/or vary.

In operation 312, an invalid object detection operation may be performed during the test time duration. In at least one embodiment, information obtained during the test time duration may be used to determine if an invalid object is provided on the charging pad.

In operation 313, a determination is made regarding whether an invalid object is detected. If no invalid object is detected in operation 313, then operation proceeds to operation 314. If an invalid object is detected in operation 313, then operation proceeds to operation 315 where power is maintained to be off, and then operations proceed to operation 301.

Calculations and/or determinations of an invalid object may all be performed within the test time duration. However, when the test time duration ends, the calculations and determinations may quickly finish in order to get the power off. Different implementations may make the actual time delay requirement looser or tighter. The power only needs to cut off (i.e., the test time duration Ttest) while waveform measurements are being performed.

In operation 314, after the test time duration, then voltage to the power transfer contacts is again provided after the test time period. Operations then return to operation 306.

The operations 306, 308, 310, 312, 313 may continuously occur. An indication (audio or video) may be made if an invalid object is determined to be present on the charging pad.

FIG. 4 shows a waveform 410 of power supply to conductive contacts according to an example arrangement. Other arrangements and operations may also be provided.

FIG. 4 shows a waveform of voltage (or power supply) applied to the power transfer contacts of the power transmitting device 10 (or charging pad 100). In FIG. 4, voltage V_ON represents a voltage difference between a positive contact and a ground contact (of the power transfer contacts 35) when a full voltage is provided from the power driver to the power transfer contacts 35 and a wire-free power transfer is provided from the power transmitting device 10 to the receiving device 50. In other words, the voltage V_ON represents voltage (or voltage difference) provided from the power transmitting device 10 to the receiving device 50.

FIG. 4 also shows a voltage V_TEST that is provided when the voltage (or power supply) to the receiving device 50 is not provided at a level to conduct current (to the receiving device 50). In other words, the power from the power transmitting device to the receiving device is substantially disconnected and the voltage V_TEST represents the voltage (or voltage difference) between the positive contact and the ground contact at the charging pad 100. The voltage V_TEST represents voltage when the power is substantially turned off (or disconnected) from the power transmitting device 10 to the receiving device 50.

The controller 202 (of the power transmitter 25) may control power being provided to the receiving device by the controller 202 controlling the power driver 204. The controller 202 may operate to disconnect power from the receiving device at a start of the time period Tsafety. The time period Tsafety is a period of time from a start of one test time duration Ttest to a start of a next test time duration Ttest. During the test time duration, the receiving device may not receive power (or may receive only residual power at a reduced voltage) from the power transmitting device 10. The time period that full power is on is (Tsafety-Ttest). Stated differently, during the test time duration, power may not be provided from the AC-DC brick to the power transfer contacts 35.

As shown in FIG. 4, a time period Tsafety is provided at a consistent frequency. In other words, a length of Tsafety is the same for each cycle of the waveform shown in FIG. 4. When a first time period Tsafety ends, then another time period Tsafety begins. The end time of one time period Tsafety is the beginning of a next time period Tsafety.

FIG. 4 shows the test time duration Ttest occurs at a start of each of the time periods Tsafety. During each test time duration Ttest (or safety check), full power is cut off from the power transmitting device 10 to the conductive contacts of the receiving device 50. Stated differently, during the test time duration, power may not be provided from the AC-DC brick to the power transfer contacts 35.

The power receiver (of the receiving device) may be disconnected from the power transmitting device at a start of every time period Tsafety (i.e., at the test time duration Ttest). However, during the test time duration, the at least one capacitor 70 (of the receiving device) may provide stored power to other components of the device (such as toward the battery). In at least one arrangement, the consistent time period Tsafety may correspond to 2.5 milliseconds (i.e., a frequency of 400 Hz), and the test time duration Ttest may be a time period of 10 microseconds, for example. These values may be stored, and may be used by the controller to control the power driver. Once the test time duration Ttest ends, the power transfer from the power transmitting device to the receiving device may be provided again (i.e., the power is turned on).

The invalid object detection operation may occur during the test time duration Ttest when power is not provided from the power transmitting device 10 to the receiving device 50. During the invalid object detection operation, the controller 202 may observe and analyze the voltage V_TEST in order to determine if any safety issues occur.

During the V_ON operation, the controller 202 may continuously monitor parameters such as Over Current Protection (OCP), Over Voltage Protection (OVP) and Under Voltage Protection (UCP) in order to detect for critical abnormalities. These parameters may be for detecting device malfunctions and/or power overload from too many devices on the charging pad.

During the invalid object detection operation, the controller 202 may monitor the voltage V_TEST to determine if any abnormal voltage changes occur. For example, safety checks may be used to determine low grade shorts, capacitance and invalid objects by voltage decay slope, voltage level at certain times, resistance measurements, current measurements and/or any combination thereof.

The invalid object detection operation includes maintaining a 'drop power' operation (V_Test) in order to test for (or determine) invalid objects on the power transfer contacts (or on the charging pad/mat). In disadvantageous arrangements, the power dropping may occur at a consistent frequency (i.e., at a consistent frequency of the time period Tsafety). The consistent frequency of the time period Tsafety may be used between the test time duration Ttest. The consistent power cycle of time periods Tsafety may result in audible noise or other artifacts that may be disruptive to the user or devices that are closer physically to the power transmitting device even if they are not actively part of the power transfer system. Disadvantageous arrangements may have a fixed frequency of 400 Hz, for example, for the consistent time periods Tsafety. This may result in several harmonics that may be provided within the audible range of frequency.

Embodiments may include an invalid object detection operation (or algorithm) that has a random frequency (such as at the invalid object detection operation) in which a frequency of the time period Tsafety changes (or varies) over time. That is, a length of the time period Tsafety varies between respective test time durations. This may be referred to as frequency shifting. Frequency shifting may help avoid and/or eliminate audio quality issues perceived by the user(s).

Embodiments may include a power duty cycling that may vary (or change) a frequency of testing in order to reduce audio artifacts and noise, for example. This may eliminate (or reduce) potential problems on the power transmitting device, the receiving device, and/or even other devices in proximity such as speakers that may couple audio noise and create a poor user experience. By varying the times of the testing (i.e., varying the time periods between adjacent test time durations), interference at any given frequency may be dramatically reduced.

Embodiments may provide time periods that are different in terms of timing. In other words, a length of the time period varies (or changes) for each of the different time periods. Since the test time durations are based on the time periods, the timing of a start of test time periods may also vary or change.

FIG. 5 shows a waveform of power supply having frequency shifting for wire-free power transfer safety detection according to an example embodiment. Other embodiments and configurations may also be provided.

FIG. 5 shows a waveform 510 of voltage (or power supply) applied to the power transfer contacts of the power transmitting device 10 (or charging pad 100). As stated above, the voltage V_ON represents a voltage difference between a positive contact and a ground contact (of the power transfer contacts 35) when a full voltage is provided from the power driver to the power transfer contacts 35 and a wire-free power transfer is provided from the power transmitting device 10 to the receiving device 50. The voltage V_ON represents voltage (or voltage difference) provided from the power transmitting device 10 to the receiving device 50.

FIG. 5 shows a voltage V_TEST that is provided when the voltage (or power supply) to the receiving device 50 is not provided at a level to conduct current (to the receiving device). In other words, the power from the power transmitting device 10 to the receiving device is substantially disconnected and the voltage V_TEST represents the voltage (or voltage difference) between the positive contact and the ground contact at the charging pad 100. The voltage V_TEST represents voltage when the power is substantially turned off (or discontinued) from the power transmitting device 10 to the receiving device 50.

FIG. 5 shows time periods having different lengths of time. For example, a length of time is different for each of the time periods T1safety, T2safety, T3safety, T4safety. By having different time periods, then the test time durations Ttest may occur at different frequencies, thus spreading out the potential radiated or conducted harmonics and energy.

In at least one embodiment, information and/or data relating to the time periods may be stored in a memory, for example. In at least one embodiment, information and/or data may be calculated or determined by the controller in real time. The controller 202 may control the power driver (and thus power to the power transfer contacts) based on the information and/or data of the respective time periods. The test time durations may be provided at a start of each of the time periods. A length of the test time durations may be the same for each of the time periods. Alternatively, lengths of the test time durations may be different for the time periods.

As shown in FIG. 5, a first test time duration Ttest1 is provided at a start of the first time period T1safety, a second test time duration Ttest2 is provided at a start of the second time period T2safety, a third test time duration Ttest3 is provided at a start of the third time period T3safety, and a fourth test time duration Ttest4 is provided at a start of the fourth time period T4safety. Other test time durations may be provided based on additional time periods.

In at least one embodiment, a length of the time periods may be different from one another. The length of the time periods may be based on a random generation (or pseudorandom generation) of the time periods. This may be referred to as random frequency generation.

The random frequency generation may be provided and generated in any of a number of different manners. For example, after each test time duration, a fixed amount of time may be added to the next time period Tsafety. A check may then be made in order to determine that the time period Tsafety is provided at a prescribed maximum deviation. If so, then the same fixed amount of time may be subtracted at the end of the next test time duration (or safety check), and may continue to be subtracted in subsequent periods until a prescribed minimum deviation occurs. This pattern may be repeated indefinitely.

In at least one embodiment, a random number generation algorithm may generate a random number at the end of each test time duration (or safety check). In at least one embodiment, a linear feedback shift register may be used to choose the increment by scaling the range of the linear feedback shift, register to the total prescribed Tsafety range and to add the minimum time period Tsafety to obtain the next time period Tsafety.

The different time periods T1safety, T2safety, T3safety, T4safety may each be individually generated and/or determined by an algorithm and/or a random generation device. This may provide different time periods between the test time durations Ttest. By providing different times at which to provide the test time duration, less audible noise may be provided.

As discussed above, the invalid object detection operation may occur during the test time durations (Ttest) when power is not provided (or is disconnected) from the power transmitting device 10 to the receiving device (or when the power transmitting device does not provide power to the receiving device). During the invalid object detection operation, the controller may observe and analyze the voltage V_TEST in order to determine if safety issues occur. For example, the controller may monitor the voltage V_TEST to determine if any abnormal voltage changes occur. For example, safety checks may occur during the test time duration in order to determine low grade shorts, capacitance and invalid objects.

As current and voltage transients occur during periods of turning power on and off, electromagnetic interference (EMI) can occur. Embodiments may alleviate audio interference issues by varying frequency of the test time durations so as to reduce the constant periodicity of the waveforms. The varying of the frequency of the test time durations is based on a varying a frequency of the time period (Tsafety) since the test time durations are dependent on the time periods. The varying of the frequency may be a random varying. By varying the frequency of the safety check over time, the magnitude of EMI at any given frequency may be dramatically reduced, thus reducing chances of interference.

In at least one embodiment, a computer-readable medium may store a program for controlling circuitry to determine a plurality of time periods having different lengths of time, and/or a program for controlling circuitry to perform an invalid object detection algorithm during test time duration. The program may be stored in a memory, which for example, may be internal or external to the controller.

Instructions or code executed by the controller may be provided to a memory from a machine-accessible medium, or an external storage device accessible via a remote connection (e.g. over a network via an antenna and/or network interface) providing access to one or more electronically-accessible media, etc. A machine-accessible medium may include any mechanism that provides (i.e., stores and/or transmits) information in a form readable by a machine (e.g., a computer). For example, a machine-accessible medium may include RAM, ROM, magnetic or optical storage medium, flash memory devices, electrical, optical, acoustical or other form of propagated signals (e.g., carrier waves, infrared signals, digital signals), etc. In alternative embodiments, hard-wired circuitry may be used in place of or in combination with the instructions or code, and thus the embodiments are not limited to any specific combination of hardware circuitry and software instructions.

The program may include code or instructions to perform any of the operations or functions performed in embodiments previously discussed above.

Elements of the above described embodiments may be provided in code segments or instructions to perform tasks. The code segments or tasks may be stored in a processor readable medium or transmitted by a computing data signal in a carrier wave over a transmission medium or communication link. The processor readable medium, machine readable medium or computer readable medium may include any medium that can store or transfer information. Examples of the processor readable medium, machine readable medium or computer readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The data signal may include any signal that can propagate over a transmission medium such as electronic network channels, optical fibers, air, electromagnetic, RF links, etc. The code segments or instructions may be downloaded via computer networks such as the Internet, Intranet, etc.

The following examples pertain to further embodiments.

Example 1 is an electronic device comprising: a power driver to receive power and to selectively provide power, a plurality of power transfer contacts to receive power from the power driver and to provide power to an external device, and a controller to control the power driver to provide power to the plurality of power transfer contacts based on a plurality of time periods having a frequency shifted such that a length of a second one of the time periods is different than a length of a first one of the time periods, and the controller to control the power driver to disconnect power from the power driver to the power transfer contacts during a plurality of test time durations, and the controller to obtain data during the plurality of test time durations.

In Example 2, the subject matter of Example 1 can optionally include the power transfer contacts to provide wire-free power transfer from the electronic device to the external device.

In Example 3, the subject matter of any one of Examples 1-2 can optionally include the power transfer contacts do not provide wire-free power transfer to the external device during the plurality of test time durations.

In Example 4, the subject matter of Example 1 can optionally include the controller to change lengths of the plurality of time periods.

In Example 5, the subject matter of Example 1 can optionally include the controller to determine presence of an invalid object on the power transfer contacts based on the obtained data during the plurality of test time durations.

In Example 6, the subject matter of any one of Examples 1 or 5 can optionally include when the controller determines the presence of the invalid object, the controller to maintain the disconnected power from the power driver to the power transfer contacts.

In Example 7, the subject matter of Example 1 can optionally include the plurality of time periods includes a first time period, a second time period and a third time period, and a length of the first time period is different than a length of the second time period, and the length of the second time period is different than a length of the third time period.

In Example 8, the subject matter of Examples 1 or 7 can optionally include the plurality of test time durations includes a first test time duration, a second test time duration and a third test time duration, wherein the first test time duration begins at a start of the first time period, the second test time duration begins at a start of the second time period, and the third test time duration begins at a start of the third time period.

In Example 9, the subject matter of Example 1 can optionally include a length of the plurality of time periods are randomly determined.

In Example 10, the subject matter of Example 1 can optionally include the controller to change a length of at least one of the plurality of time periods.

In Example 11, the subject matter of Example 1 can optionally include an alternating current-direct current (AC-DC) brick to receive AC power and provide DC power to the power driver.

In Example 12, the subject matter of Example 1 can optionally include the electronic device is a power transmitting device.

In Example 13, the subject matter of Example 1 can optionally include a charging pad, and the plurality of power transfer contacts to be provided on the charging pad.

In Example 14, the subject matter of Example 1 can optionally include the power transfer contacts include positive contacts and ground contacts.

In Example 15, the subject matter of Example 1 can optionally include the obtained data relates to an invalid object on the power transfer contacts.

Example 16 is an electronic device comprising: a power driver to receive power and to selectively provide power, a plurality of power transfer contacts to receive power from the power driver and to provide power to an external device, and a controller to determine a plurality of test time durations based on a plurality of time periods, and the controller to change a length of time of at least one of the time periods, and the controller to control the power driver to disconnect power from the power driver to the power transfer contacts during the plurality of test time durations, and the controller to obtain data during the plurality of test time durations.

In Example 17, the subject matter of Example 16 can optionally include the power transfer contacts to provide wire-free power transfer from the electronic device to the external device.

In Example 18, the subject matter of any one of Examples 16-17 can optionally include the power transfer contacts do not provide wire-free power transfer to the external device during the plurality of test time durations.

In Example 19, the subject matter of Example 16 can optionally include the controller to determine presence of an invalid object on the power transfer contacts based on the obtained data during the plurality of test time durations.

In Example 20, the subject matter of any one of Examples 16 or 19 can optionally include when the controller determines the presence of the invalid object, the controller to maintain the disconnected power from the power driver to the power transfer contacts.

In Example 21, the subject matter of Example 16 can optionally include the plurality of time periods includes a first time period, a second time period and a third time period, and a length of the first time period is different than a length of the second time period, and the length of the second time period is different than a length of the third time period.

In Example 22, the subject matter of any one of Examples 16 or 21 can optionally include the plurality of test time durations includes a first test time duration, a second test time duration and a third test time duration, wherein the first test time duration begins at a start of the first time period, the second test time duration begins at a start of the second time period, and the third test time duration begins at a start of the third time period.

In Example 23, the subject matter of Example 16 can optionally include a length of time of the plurality of time periods are randomly determined.

In Example 24, the subject matter of Example 16 can optionally include the controller is to change a frequency of the plurality of time periods.

In Example 25, the subject matter of Example 16 can optionally include an alternating current-direct current (AC-DC) brick to receive AC power and provide DC power to the power driver.

In Example 26, the subject matter of Example 16 can optionally include the electronic device is a power transmitting device.

In Example 27, the subject matter of Example 16 can optionally include a charging pad, and the plurality of power transfer contacts are on the charging pad.

In Example 28, the subject matter of Example 16 can optionally include the power transfer contacts include positive contacts and ground contacts.

In Example 29, the subject matter of Example 16 can optionally include the obtained data relates to an invalid object on the power transfer contacts.

Example 30 is an electronic device comprising: power means for receiving power and for selectively providing power, a plurality of power transfer contacts to receive power from the power means and to provide power to an external device, and control means for controlling the power means to provide power to the plurality of power transfer contacts based on a plurality of time periods having a frequency shifted such that a length of a second one of the time periods is different than a length of a first one of the time periods, and the control means for controlling the power means to disconnect power provided to the power transfer contacts during a plurality of test time durations, and the control means for obtaining data during the plurality of test time durations.

In Example 31, the subject matter of Example 30 can optionally include the power transfer contacts to provide wire-free power transfer from the electronic device to the external device.

In Example 32, the subject matter of any one of Examples 30-31 can optionally include the power transfer contacts do not provide wire-free power transfer to the external device during the plurality of test time durations.

In Example 33, the subject matter of Example 30 can optionally include the control means for changing lengths of the plurality of time periods.

In Example 34, the subject matter of Example 30 can optionally include the control means for determining presence of an invalid object on the power transfer contacts based on the obtained data during the plurality of test time durations.

In Example 35, the subject matter of any one of Examples 30 or 34 can optionally include claim when the control means determines the presence of the invalid object, the control means for maintaining the disconnected power from the power means to the power transfer contacts.

In Example 36, the subject matter of Example 30 can optionally include the plurality of time periods includes a first time period, a second time period and a third time period, and a length of the first time period is different than a length of the second time period, and the length of the second time period is different than a length of the third time period.

In Example 37, the subject matter of any one of Examples 30 or 36 can optionally include the plurality of test time durations includes a first test time duration, a second test time duration and a third test time duration, wherein the first test time duration begins at a start of the first time period, the second test time duration begins at a start of the second time period, and the third test time duration begins at a start of the third time period.

In Example 38, the subject matter of Example 30 can optionally include a length of the plurality of time periods are randomly determined.

In Example 39, the subject matter of Example 30 can optionally include the control means for changing a length of at least one of the plurality of time periods.

In Example 40, the subject matter of Example 30 can optionally include a charging pad, and the plurality of power transfer contacts to be provided on the charging pad.

In Example 41, the subject matter of Example 30 can optionally include the power transfer contacts include positive contacts and ground contacts.

In Example 42, the subject matter of Example 30 can optionally include the obtained data relates to an invalid object on the power transfer contacts.

Example 43 is a machine-readable medium comprising one or more instructions that when executed cause a controller to perform one or more operations to: provide power to a plurality of power transfer contacts based on a plurality of time periods having a frequency shifted such that a length of a second one of the time periods is different than a length of a first one of the time period, disconnect power to the power transfer contacts during a plurality of test time durations, and obtain data during the plurality of test time durations, provide wire-free power transfer to the receiving device at times other than the test time durations.

In Example 44, the subject matter of Example 43 can optionally include the power transfer contacts do not provide the wire-free power transfer to the receiving device during the plurality of test time durations.

In Example 45, the subject matter of Example 43 can optionally include the one or more operations further to change lengths of the plurality of time periods.

In Example 46, the subject matter of Example 43 can optionally include the one or more operations further to determine presence of an invalid object on the power transfer contacts based on the obtained data during the plurality of test time durations.

In Example 47, the subject matter of Example 43 can optionally include when the presence of the invalid object is determined, the one or more operations further to maintain the disconnected power to the power transfer contacts.

In Example 48, the subject matter of Example 43 can optionally include the plurality of time periods includes a first time period, a second time period and a third time period, and the length of the first time period is different than the length of the second time period, and the length of the second time period is different than a length of the third time period.

In Example 49, the subject matter of any one of Examples 43 or 48 can optionally include the plurality of test time durations includes a first test time duration, a second test time duration and a third test time duration, wherein the first test time duration begins at a start of the first time period, the second test time duration begins at a start of the second time period, and the third test time duration begins at a start of the third time period.

In Example 50, the subject matter of Example 43 can optionally include the one or more operations further to randomly determine a length of the plurality of time periods.

In Example 51, the subject matter of Example 43 can optionally include the one or more operations further to change a length of at least one of the plurality of time periods.

In Example 52, the subject matter of Example 43 can optionally include the obtained data relates to an invalid object on the power transfer contacts.

Example 53 is a method of power transfer to a receiving device comprising: providing power to a plurality of power transfer contacts based on a plurality of time periods having a frequency shifted such that a length of a second one of the time periods is different than a length of a first one of the time period, disconnecting power to the power transfer contacts during a plurality of test time durations, obtaining data during the plurality of test time durations, and providing wire-free power transfer to the receiving device at times other than the test time durations.

In Example 54, the subject matter of Example 53 can optionally include the power transfer contacts do not provide the wire-free power transfer to the receiving device during the plurality of test time durations.

In Example 55, the subject matter of Example 53 can optionally include changing the lengths of the plurality of time periods.

In Example 56, the subject matter of Example 53 can optionally include determining presence of an invalid object on the power transfer contacts based on the obtained data during the plurality of test time durations.

In Example 57, the subject matter of Example 53 can optionally include when the presence of the invalid object is determined, maintaining the disconnected power to the power transfer contacts.

In Example 58, the subject matter of Example 53 can optionally include the plurality of time periods includes a first time period, a second time period and a third time period, and the length of the first time period is different than the length of the second time period, and the length of the second time period is different than a length of the third time period.

In Example 59, the subject matter of any one of Examples 53 or 58 can optionally include the plurality of test time durations includes a first test time duration, a second test time duration and a third test time duration, wherein the first test time duration begins at a start of the first time period, the second test time duration begins at a start of the second time period, and the third test time duration begins at a start of the third time period.

In Example 60, the subject matter of Example 53 can optionally include randomly determine a length of the plurality of time periods.

In Example 61, the subject matter of Example 53 can optionally include changing a length of at least one of the plurality of time periods.

In Example 62, the subject matter of Example 53 can optionally include the obtained data relates to an invalid object on the power transfer contacts.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
   a power driver to receive power and to selectively provide power;
   a plurality of power transfer contacts to receive power from the power driver and to provide power to an external device; and
   a controller to control the power driver to provide power to the plurality of power transfer contacts based on a plurality of time periods having a frequency shifted such that a length of a second one of the time periods is different than a length of a first one of the time periods, and the controller to control the power driver to disconnect power from the power driver to the power transfer contacts during a plurality of test time durations, and the controller to obtain data during the plurality of test time durations.

2. The electronic device of claim 1, wherein the power transfer contacts are to provide wire-free power transfer from the electronic device to the external device.

3. The electronic device of claim 2, wherein the power transfer contacts do not provide wire-free power transfer to the external device during the plurality of test time durations.

4. The electronic device of claim 1, wherein the controller is to determine a presence of an invalid object on the power transfer contacts based on the obtained data during the plurality of test time durations.

5. The electronic device of claim 4, wherein when the controller determines the presence of the invalid object, the controller is to maintain the disconnected power from the power driver to the power transfer contacts.

6. The electronic device of claim 1, wherein the plurality of time periods includes a first time period, a second time period and a third time period, and a length of the first time period is different than a length of the second time period, and the length of the second time period is different than a length of the third time period.

7. The electronic device of claim 6, wherein the plurality of test time durations includes a first test time duration, a second test time duration and a third test time duration, wherein the first test time duration begins at a start of the first time period, the second test time duration begins at a start of the second time period, and the third test time duration begins at a start of the third time period.

8. The electronic device of claim 1, wherein the obtained data relates to an invalid object on the power transfer contacts.

9. A non-transitory machine-readable medium comprising one or more instructions, wherein execution of the instruction by a controller is to cause the controller to:
   provide power to a plurality of power transfer contacts based on a plurality of time periods having a frequency shifted such that a length of a second one of the time periods is different than a length of a first one of the time periods;
   disconnect power to the power transfer contacts during a plurality of test time durations;
   obtain data during the plurality of test time durations; and
   provide wire-free power transfer to a receiving device at times other than the test time durations.

10. The non-transitory machine-readable medium of claim 9, wherein the power transfer contacts do not provide the wire-free power transfer to the receiving device during the plurality of test time durations.

11. The non-transitory machine-readable medium of claim 9, wherein execution of the instructions is to cause the controller to change lengths of the plurality of time periods.

12. The non-transitory machine-readable medium of claim 9, wherein execution of the instructions is to cause the controller to determine presence of an invalid object on the power transfer contacts based on the obtained data during the plurality of test time durations.

13. The non-transitory machine-readable medium of claim 12, wherein when the presence of the invalid object is determined, execution of the instructions is to cause the controller to maintain the disconnected power to the power transfer contacts.

14. The non-transitory machine-readable medium of claim 9, wherein execution of the instructions is to cause the controller to randomly determine a length of the plurality of time periods.

15. The non-transitory machine-readable medium of claim 9, wherein the obtained data relates to an invalid object on the power transfer contacts.

16. A method of power transfer to a receiving device comprising:
   providing power to a plurality of power transfer contacts based on a plurality of time periods having a frequency shifted such that a length of a second one of the time periods is different than a length of a first one of the time periods;
   disconnecting power to the power transfer contacts during a plurality of test time durations;
   obtaining data during the plurality of test time duration; and
   providing wire-free power transfer to the receiving device at times other than the test time durations.

17. The method of claim 16, wherein the power transfer contacts do not provide the wire-free power transfer to the receiving device during the plurality of test time durations.

18. The method of claim 16, further comprising determining presence of an invalid object on the power transfer contacts based on the obtained data during the plurality of test time durations.

19. The method of claim 18, wherein when the presence of the invalid object is determined, the method comprises maintaining the disconnected power to the power transfer contacts.

20. The method of claim 16, wherein the obtained data relates to an invalid object on the power transfer contacts.

21. The electronic device of claim 1, wherein the controller is to change a length of at least one of the plurality of time periods.

22. The electronic device of claim 1, wherein the power comprises direct current (DC) power, and the power driver is to receive the DC power from an alternating current-direct current (AC-DC) brick.

23. A wire-free power transfer system, comprising:
   a power receiving device and a power transmitting device, wherein the power receiving device comprises a plurality of power receiving conductive contacts to electrically couple the power receiving device to the power transmitting device, and
   wherein the power transmitting device comprises:
      a power driver to selectively provide power to a plurality of power transfer contacts, wherein the plurality of power transfer contacts are to provide power to the power receiving device via the plurality of power receiving conductive contacts, and a controller coupled to the power driver, the controller to:
control the power driver to provide power to the plurality of power transfer contacts based on a plurality of time periods having a frequency shifted such that a length of a second one of the time periods is different than a length of a first one of the time periods,
control the power driver to disconnect power from the power driver to the power transfer contacts during a plurality of test time durations,
obtain data during the plurality of test time durations, and
provide wire-free power transfer to the power receiving device at times other than the test time durations.

24. The wire-free power transfer system of claim 23, wherein the controller is to vary a period between one or more adjacent test time durations of the plurality of test time durations.

25. The wire-free power transfer system of claim 23, wherein the power transmitting device is a charging pad or charging mat, wherein each of the plurality of power transfer contacts is positioned parallel to one another, and one or more of the plurality of power transfer contacts are positive contacts and other ones of the plurality of power transfer contacts are ground contacts.

* * * * *